J. MÜLLER.
MEANS FOR CONTROLLING THE INJECTION AIR OF COMBUSTION ENGINES.
APPLICATION FILED APR. 30, 1913.
1,126,831.
Patented Feb. 2, 1915.
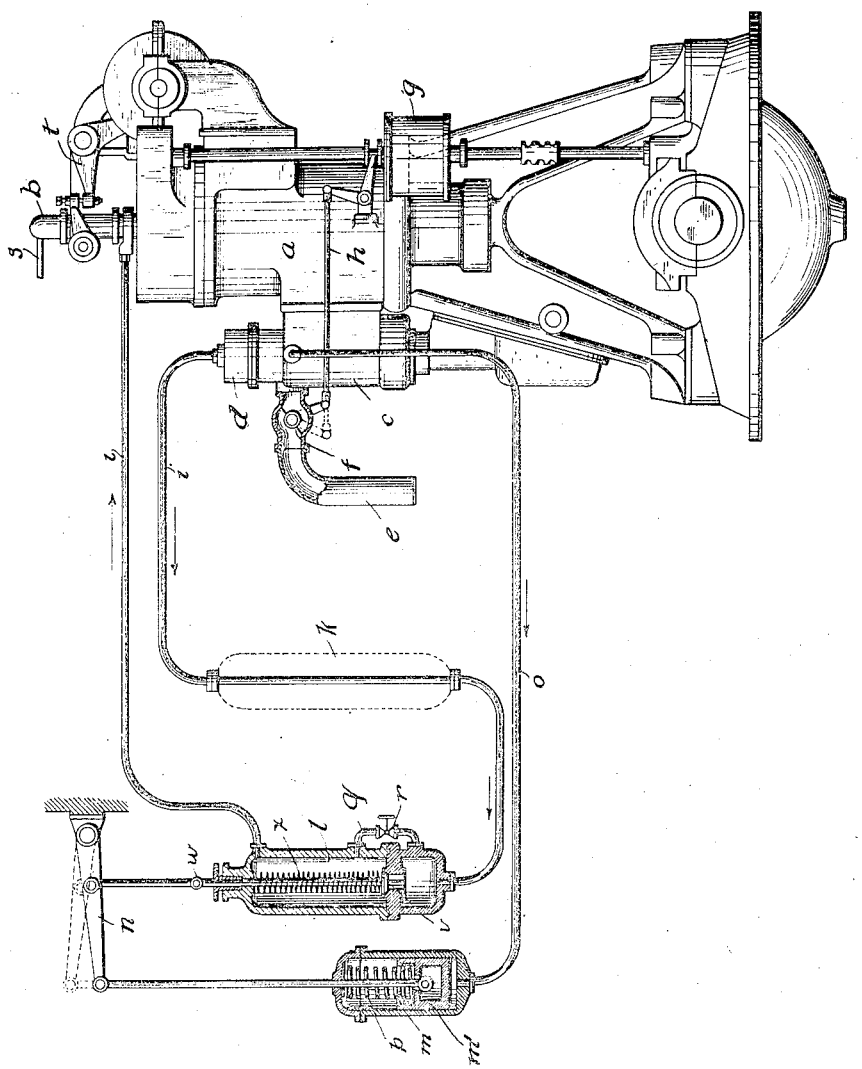
WITNESSES
INVENTOR
BY
ATTORNEYS

UNITED STATES PATENT OFFICE.

JAKOB MÜLLER, OF WINTERTHUR, SWITZERLAND, ASSIGNOR TO BUSCH-SULZER BROS.-DIESEL ENGINE COMPANY, OF ST. LOUIS, MISSOURI, A CORPORATION OF MISSOURI.

MEANS FOR CONTROLLING THE INJECTION-AIR OF COMBUSTION-ENGINES.

1,126,831.                Specification of Letters Patent.         Patented Feb. 2, 1915.

Application filed April 30, 1913. Serial No. 764,499.

*To all whom it may concern:*

Be it known that I, JAKOB MÜLLER, engineer, a citizen of the Republic of Switzerland, residing at Winterthur, Canton of Zurich, Switzerland, have invented the following described new and useful Improvements in Means for Controlling the Injection-Air of Combustion-Engines.

This invention relates to the regulation of internal combustion engines of the kind in which the fuel is injected in atomized form into the cylinders by air under relatively high pressure, as, for example, Diesel type engines in which the fuel is thus introduced partly or wholly during a part of the working stroke into a body of air previously highly compressed in the cylinder to a temperature sufficient to produce ignition. Regulation of the output of such engines, either to compensate for load variations or to change the speed, is effected in various ways, among them by varying the pressure of the fuel injection air; and the object of the present invention is to provide simple and effective means for securing prompter regulation of this factor at the point of injection than has customarily been attained. According to a common practice the injection air pressure is increased or decreased by variably throttling the intake of the multi-stage air compressor driven by the engine, thus altering the quantity supplied by the high pressure stage of such compressor to the injection air line; but under such conditions, and particularly when receivers and cooling provisions are interposed between the stages of the pump or between the latter and the fuel valve, or both, the response in the line immediately to said valve is comparatively sluggish, so that the sensitiveness of control which is desirable or necessary when operating under frequently or suddenly varying load conditions is not obtainable.

The application of Paul G. Roesti, Serial No. 700,948, filed June 1, 1912, discloses a construction whereby the prompt variation in pressure in a low pressure stage of the compressor or even in the suction line thereof, produced as heretofore by throttling the intake more or less, either manually or automatically, is utilized to vary the pressure in the injection line in a corresponding manner and with substantially equal promptitude through suitable connections controlling a throttling device in the said line. In this way not only is the pressure of the injection air varied in the high pressure line in a convenient and practical manner, but a dual control is provided which is particularly effective in securing sensitive and exact regulation.

The present invention relates to certain improvements in such apparatus.

The accompanying drawing illustrates an embodiment of the invention, parts being shown in section and parts in elevation, and no attempt being made to show the throttling and control devices for the high pressure line in scale proportional to the engine.

The drawing represents an ordinary Diesel engine *a*, either two cycle or four cycle, having a usual form of atomizing fuel valve *b*, with a connection *s* to the oil supply and a connection to the high pressure air line *i*. The internal construction of such valves is well known and is therefore not illustrated. The engine is further provided with a usual or suitable automatic governor *g*, which, in addition to controlling the air pressure as hereinafter described, may also vary the valve lift, that is to say the duration of fuel admission, in the well known manner by eccentrically shifting the fulcrum of the valve lifting lever *t*.

A usual form of two stage air compressor driven by the engine is indicated at *c*, *d*, The construction of such multistage compressors is familiar to those skilled in the art and requires no particular illustration or description here. The suction line or intake for the first or low pressure stage *c* will be recognized at *e*, and it will be understood that the air passes from one stage to another in the usual manner and that the usual cooling and receiver provisions may be interposed between the stages. From the high pressure stage extends the injection air line *i*, and receivers and cooling provisions may also be provided therein, a receiver being indicated by dotted lines at *k*. Obviously the compressor might have more than two stages, and if the engine operates on a two stroke cycle, air from a low pressure stage will be used for scavenging as is customary.

In the pump intake *e* is a suitable or usual form of throttle valve, such as indicated at *f*, and this valve may be operated either manually or automatically, or in both ways. Automatic control is indicated by linkage $h$ from the stem of the governor $g$. By connections of this or other appropriate character the amount of air drawn in by the pump is regulated in proportion to the variations of engine load, and in consequence of this intake throttling there is a substantially immediate change of pressure in the lower stage or stages of the compressor, but under ordinary conditions it would take an appreciable length of time for the effect to reach the portion of the high pressure line leading directly to the fuel valve. This defect is remedied in the present invention as above stated by the provision of a second throttling or flow-controlling device $l$ in the high pressure line and means, such as indicated at $o$, $m$, $n$, for controlling this throttle valve directly by fluctuations in pressure at the pump, and more especially in a low pressure stage thereof. It will be apparent that the valve $l$ may be of any suitable character. As shown it comprises a valve member $v$ having a stem and connecting rod $w$ whereby it may be lifted more or less away from its seat in opposition to a spring $x$ to seat the valve. The part $m$ is a pneumatic device or motor mechanically connected with the valve $l$ on the one hand and in communication with a low pressure stage of the pump on the other. Its construction may of course be varied, but as shown somewhat diagrammatically in the drawing it comprises a cylinder, connected by a pipe $o$ with the pump, and a piston $m'$, which is thus subjected to the varying pressure effects in the pump corresponding to the setting of the throttle $f$. The movement of the piston in one direction can be controlled by a spring $p$ or in any usual way, this representation of the regulating motor being merely representative of any suitable type of similar device, and it will be understood that in practice any suitable provisions may be applied to it for increasing the positiveness and steadiness of its action, such, for example, as the addition of dash-pot agencies for determining definite rates and limits of the piston's movement. The pipe $o$, it will be understood, connects with the low pressure stage of the pump, or with the connection whereby the air is transferred from the low to the high pressure stage, or even with the inlet $e$, provided such connection be between the throttle $f$ and the pump. In the latter event a partial vacuum would exist below the piston $m'$, and the spring $p$ would be adapted to act against the pressure of the atmosphere at the other side thereof.

In order to permit the passage of a desired or predetermined minimum amount of air so as to insure a pressure of low value in the injection line appropriate for a certain light load or for no load, a by-pass $q$ is provided around the valve member $v$ and its seat, this by-pass being of small cross-sectional area or having its area reduced by an adjusting valve $r$. Such valve enables the minimum flow and minimum pressure of the injection air to be set for any value desired.

In operation, if there is a change in the working load of the engine, the governor $g$ moves the valve $f$ in the intake of the pump in the appropriate manner to increase or decrease the amount of air drawn in, as the case may be, and the resulting change in pressure in the lower pressure stages or passages of the pump is communicated promptly to the pneumatic device $m$, which moves the valve member $v$ in the injection line, so as to increase or decrease the area for flow, thereby producing an increase or decrease in the pressure in the line leading to the fuel valve.

With multicylinder motors there may be devices $l$, $m$ for each cylinder or group of cylinders, or an assemblage such as shown may serve all of the cylinders. Manifestly numerous changes and substitutions may be made without departing from the invention, as, for example, a diaphragm device could be used in place of the cylinder and piston construction $m$.

What is claimed as new is:

1. The combination with an internal combustion engine having fuel injection means, an air compressor, a high pressure line connecting the compressor with said fuel injection means, and a governor controlling the air compressor, of a throttle valve in the high pressure line comprising a casing and valve seat and a valve member movable toward and from its seat loaded by a spring, and a pneumatic device connected with a low pressure portion of the compressor and controlling said valve member.

2. The combination with an internal combustion engine having fuel injection means, an air compressor, a high pressure line connecting the compressor with said fuel injection means, and a governor controlling the air compressor, of a flow controlling valve in the high pressure line, a by-pass around said valve adapted to permit the passage of a limited quantity of air, and a pneumatic device connected with a low pressure portion of the compressor and controlling said valve.

3. The combination with an internal combustion engine of the Diesel type having fuel injection means and a high pressure line leading thereto, of a flow-controlling valve in said line, and a by-pass around said valve adapted to permit the passage of a limited quantity of air.

4. The combination with an internal combustion engine of the Diesel type having fuel injection means and a high pressure line leading thereto, of a flow-controlling valve in said line, a by-pass around said valve, and a flow-controlling valve in said by-pass for permitting the passage of an adjustable minimum quantity of air.

5. The combination with an internal combustion engine of the Diesel type having fuel injection means and a high pressure line leading thereto, of automatic means for regulating the flow and consequently the pressure in said line, and a by-pass around said means adapted to permit a predetermined minimum flow.

In testimony whereof, I have signed this specification in the presence of two witnesses.

JAKOB MÜLLER

Witnesses:
 CARL GUBLER,
 HARRY A. MCBRIDE.